(12) United States Patent
Frese et al.

(10) Patent No.: US 6,429,790 B1
(45) Date of Patent: Aug. 6, 2002

(54) DEVICE FOR INCREASING TRAFFIC SAFETY

(75) Inventors: Thomas Frese, Gehrden; Richard Aumayer, Diekholzen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,772

(22) PCT Filed: May 22, 1999

(86) PCT No.: PCT/DE99/01522

§ 371 (c)(1),
(2), (4) Date: Dec. 1, 2000

(87) PCT Pub. No.: WO99/63502

PCT Pub. Date: Dec. 9, 1999

(30) Foreign Application Priority Data

Jun. 2, 1998 (DE) ......................................... 198 24 582
Jul. 9, 1998 (DE) ......................................... 198 30 626

(51) Int. Cl.[7] .................................................. G08G 1/09
(52) U.S. Cl. .................... 340/905; 340/933; 340/995
(58) Field of Search ............................... 340/901, 902, 340/905, 933, 936, 988, 995; 180/167, 168; 701/210, 213

(56) References Cited

U.S. PATENT DOCUMENTS

| 4,361,202 A | * | 11/1982 | Minovitch | 180/168 |
| 5,504,482 A | * | 4/1996 | Schreder | 340/995 |
| 5,771,484 A | * | 6/1998 | Tognazzini | 340/601 |
| 5,917,430 A | * | 6/1999 | Greneker et al. | 340/905 |
| 6,101,443 A | * | 8/2000 | Kato et al. | 340/995 |
| 6,124,886 A | * | 9/2000 | DeLine et al. | 340/438 |

FOREIGN PATENT DOCUMENTS

| DE | 42 10 170 | 6/1993 |
| DE | 196 26 114 | 1/1998 |
| EP | 0 625 770 | 11/1994 |
| FR | 2 655 755 | 6/1991 |
| FR | 2 693 582 | 1/1994 |

* cited by examiner

*Primary Examiner*—Van Trieu
(74) *Attorney, Agent, or Firm*—Kenyon & Kenyon

(57) ABSTRACT

In a system for increasing traffic safety, objects that can be located on or by a sheet are provided with transmitters of short transmission range. The transmitters transmit safety-related data in a form that can be received by receivers in other objects located on or by the street.

14 Claims, 3 Drawing Sheets

DEVICE FOR INCREASING TRAFFIC SAFETY

This application is the national stage under U.S.C. 371 of PCT/DE99/01522 filed May 22, 1999.

FIELD OF THE INVENTION

The present invention relates to a device for increasing traffic safety.

BACKGROUND INFORMATION

In traffic, all participants at present move without informing the other participants concerning their experiences, present situations, and destinations. Among the few exceptions are, for example, directional signals and the brake lights on motor vehicles.

Information regarding other traffic participants in the possession of all or a portion of the traffic participants would contribute to a significant improvement in the area of traffic flow and traffic safety.

SUMMARY OF THE INVENTION

This objective is achieved according to the present invention through the fact that objects that can be located on or by the roadway are furnished with transmitters having short transmission ranges, that transmit safety-related data in a form that can be received by receivers in other objects located on or by the roadway.

In contrast to the customary methods for recognizing other traffic participants and/or obstacles, for example, using radar or ultrasound sensors, the device according to the present invention has the advantage that information transmitted by the other object is available earlier than an approximation that is perhaps only measurable in the shortest of ranges, especially that the information present in the other object, for example, the direction of travel or an intention to change lanes, can be received and be taken into account in the reference vehicle even before the actual event occurs to which the reference vehicle must react.

In addition, using the device according to the present invention, objects can be taken into account that can be detected by distance measuring systems only with difficulty or in distorted form. Thus it is entirely possible to furnish pedestrians with a transmitter of the device of the present invention. Trucks having an extremely planar cargo area, for example, empty automobile transporters, can be recognized as such using the device according to the present invention, whereas detection using distance measuring systems frequently "overlooks" the cargo area.

Although devices according to the present invention have their greatest effectiveness if nearly all vehicles and, if possible, other objects are furnished with devices according to the present invention, equipping single groups of traffic participants, for example, drivers of a special automobile model, can be advantageous.

Overall, using the device according to the present invention, increased safety, improved traffic flow, and also greater care for the environment are possible.

One particularly advantageous embodiment of the device according to the present invention rests in the fact that the objects are motor vehicles and that the safety-related data contain operational data of the specific vehicle. On this basis, it is possible to transmit, especially to other motor vehicles, information from the past, current information, and information concerning the future behavior of the motor vehicle.

In this embodiment, it is advantageously provided that the operational data can be supplied, via a bus system, by at least one other device of the vehicle. Since, in modern vehicles, a substantial portion of the information is exchanged in any case via a bus system, especially via the so-called CAN bus, the expense of the device according to the present invention can be kept extremely low. In the event that individual manufacturers of motor vehicles do not employ standardized data formats in their bus systems, it can be provided, in this context, that a device for converting the data format is arranged between the bus system and the transmitter.

Another advantageous embodiment makes possible a substantial increase in traffic safety as a result of the fact that the operational data include information concerning the specific position of the vehicle and concerning the velocity, preferably with respect to amount and direction. Using this information, it is possible, for example, for the driver of a following vehicle to be made aware of a vehicle traveling slowly in front of him and, optionally, for the following vehicle to be braked automatically. In this context, in transmitting the direction of motion, it is also possible to distinguish between oncoming vehicles and those traveling in the same direction.

In this embodiment, it can be provided that the operational data also contain information regarding changes in the operational data. A change of this type can be, for example, a braking deceleration, to prevent pile-ups.

In addition, it is possible in this embodiment to provide that the operational data contain information regarding operator inputs in the vehicle. In this way, it is possible, if appropriate, to detect changes in the performance of the vehicle in question even earlier.

The above-mentioned embodiment can also be configured such that the operational data contain switching information such as turn signal lights right/left on, lights and fog lights on/off, windshield wipers on/off. This information, on the one hand, can be evaluated by other vehicles and can be read by the respective drivers as a warning or as general information. However, by evaluating information of this type, it is entirely possible, with the assistance of receivers arranged on the roadway, to generate warnings about, for example, fog or heavy rain.

Another embodiment of the present invention provides that the data contain authorization information. This embodiment can be applied in a multitude of ways, for example, for improved recognition of official vehicles (fire department, police, ambulances), or for information concerning special authorizations, e.g., the authorization for using a bus lane or as access authorization for parking places, garages, and private property.

The savings in time until a reaction occurs in a following, transmission-receiving vehicle are particularly large if there is a plurality of other vehicles located between a transmitting vehicle, which, for example, brakes suddenly, and the receiving vehicle. For then it is possible immediately to display a warning, whereas without the device according to the present invention, using a distance measuring system, it is necessary to take into account a delay in the reaction from one vehicle to another, which adds up for the receiving vehicle. This delay can be especially significant if not all vehicles are furnished with automatic distance measuring systems and brake systems. In the device according to the present invention, irrespective of the perhaps quite long reaction time of individual vehicles, a reaction can be initiated if a vehicle traveling relatively far ahead suddenly brakes.

Transmitters of the device according to the present invention can be arranged not only in vehicles but also in stationary objects. Thus, for example, in a further refinement of the device according to the present invention, it is provided that the objects are traffic signals or road signs, the safety-related data containing the position and the specific meaning for traffic participants. Thus, for example, in the case of traffic signals, the position and the specific signal setting, i.e., red, yellow, or green, is transmitted.

In the case of road signs, in addition to an unvarying meaning—for example, a constant speed limit—, it is also possible to transmit changing information, for example, a speed limit of 90 km/h, 100 km/h, or 120 km/h. In this context, information concerning the change can be conveyed to the road sign in the customary manner, for example, via cable or via transmitters of greater transmission range.

One other advantageous embodiment rests in the fact that the objects are stationary traffic guidance devices, the safety-related data containing the position of the specific traffic guidance device. In this manner, beacons, which, for example, border a construction area, and other roadway boundary markers can be safeguarded in a simple manner.

In order that the transmitted information be able to be used in vehicles, it is provided according to a further embodiment of the present invention that, for receiving the transmitted data, built-in receivers are arranged in vehicles. This embodiment is preferably designed so that the receivers are connected, in each case, to an evaluation unit, which compares the information contained in the received data with the operational data of the reference vehicle and thereupon decides whether the respective data received from a transmitter of an object are relevant for the reference vehicle, and that in the event the specific data in the reference vehicle are relevant, a display is activated. In this way, important information can be given to the driver of the vehicle.

However, to make a reaction possible even in the event of the inattentiveness of the driver, it can also be provided in this embodiment that an intervention take place in the drive/brake system of the reference vehicle. Depending on the design of the vehicle, this intervention can be carried out via appropriate control units, which, for example, also deal with the light distribution and navigation.

In another embodiment of the present invention, it is provided that a stationary receiver be configured for the statistical evaluation of the speeds received from vehicles. In this way, data on traffic control and the production of traffic messages, especially TMC messages, can be extracted.

In the refinements and embodiments of the present invention heretofore mentioned, the transmission of data making possible an identification of the vehicle in the form of, e.g., a police identifier, has been left out of the account. This can also be for reasons of data protection. However, to the extent that it is permitted generally or in a specific case, it can be provided in accordance with a further refinement that the transmitted data in addition to operational data contain data for identifying the vehicle.

This refinement makes possible further advantageous embodiments. Thus, for example, it can be provided that, in a stationary receiver, an evaluation unit compares previously stored data with received data for identification purposes and emits a signal if the received identification conforms with one of the stored identifications. Using this embodiment, it is possible to detect an illegally used vehicle or a vehicle having special authorization. Optionally, the emitted signal can then be used for the information of a police station or even for closing or opening a barrier.

This embodiment can also be refined such that the signal emitted by the evaluation unit is conveyed via a likewise stationary transmitter to the receiver of the specific vehicle, resulting in the shutdown of the vehicle.

A further advantageous embodiment of the present invention employing the identification of the vehicle rests in the fact that a plurality of stationary receivers arranged in a roadway network convey identifications to a central office for calculating tolls.

Finally, a device according to the present invention can also be configured such that a stationary receiver is provided with a device for recording the identification and speed received from a specific vehicle. Thus, speed controls can be carried out in a simple manner, avoiding the disadvantages of customary radar surveillance—namely, the conspicuousness of radar installations, the high personnel requirements, and the imprecision of the measurements.

Depending on the detailed requirements and prerequisites, much current information of interest for other traffic participants can be transmitted so that the driver's own decisions can be made better, more rapidly, and with greater confidence. Below, information of this type is indicated, a division being undertaken as a function of the time or the space the information relates to.

1. From the past, before time x or from space x:
    is coming from direction x
    wiper system was active
    light was on
    front fog lights were active
    speed was . . .
    I braked
    anti-lock system was active
    driving dynamics control was active
    I accelerated
    I stopped
    steering angle left/right
    turn signal lights left/right
    radius of curve
    direction of curve
    tendency of the curve direction
    incline/gradient
    tendency of incline/gradient
    banking slope
    permissible speed
    kind of street, type of street
    width of roadway
    width of lane
    lanes in each direction of travel
    distance to the next intersection
    bridge
    tunnel
    railway overpass.
2. From the present:
    I am traffic participant x (e.g., passenger car truck, pedestrian, motorcycle, tractor, bicyclist, vehicle make, etc.)
    I am traffic participant of the group x (e.g., automobile make)
    location (from navigation)
    current speed
    I am about to brake anti-lock system is active driving dynamics control is active I am about to accelerate wiper system is on light is on fog lamps are on I am parking I am traveling in direction I am stopping steering angle left/right turn signal lights left/right radius of curve direction of curve tendency of the curve direction incline/gradient tendency of incline/gradient banking slope permissible speed kind of street, type of street width of roadway width of lane lanes in each direction of travel distance to the next intersection bridge tunnel railway overpass.

emergency call, I need help

I have a technical problem distance to vehicle in front of me is x

I am passing.

3. For the future:

I am traveling/intending to travel to

I am moving in the direction

I see an obstacle in front of me at location x speed will be (automatic speed control).

The kind and number of the informational units that are transmitted or are received from other traffic participants, ultimately depends on whether this information is available to the transmitting traffic participant. Therefore, the number of informational entries can vary from object to object. The data can be anonymous or can be related to the specific traffic participant. The information does not need to be stored, or needs only to be stored in abbreviated form, by the specific receiving traffic participants. In this context, the selection of the information relevant in the specific case can be changeable, for example, depending on the position, a specific code, or a code assigned to a group (for example, the vehicles of one manufacturer).

From one traffic participant, only that information is transmitted which is also available. For example, a vehicle that is parking can only transmit vehicle type and location. A bicyclist can only transmit, for example, vehicle type, location, and direction of travel, etc. A traffic participant will only further process the data that are of interest for him, namely, that which permit him to arrive at better decisions for his behavior. In principle, all vehicle participants, including pedestrians, can be equipped with a corresponding device.

The extra expense for the device according to the present invention is limited to a transmitting/receiving unit having an interface to one or a plurality of bus systems, which are present in any case. The required transmitting power is extremely low, i.e., generally lower than that of a hand mobile telephone (Handy). In the event that radio sets are present, they can also be used, if appropriate.

DETAILED DESCRIPTION

Figure 1A:
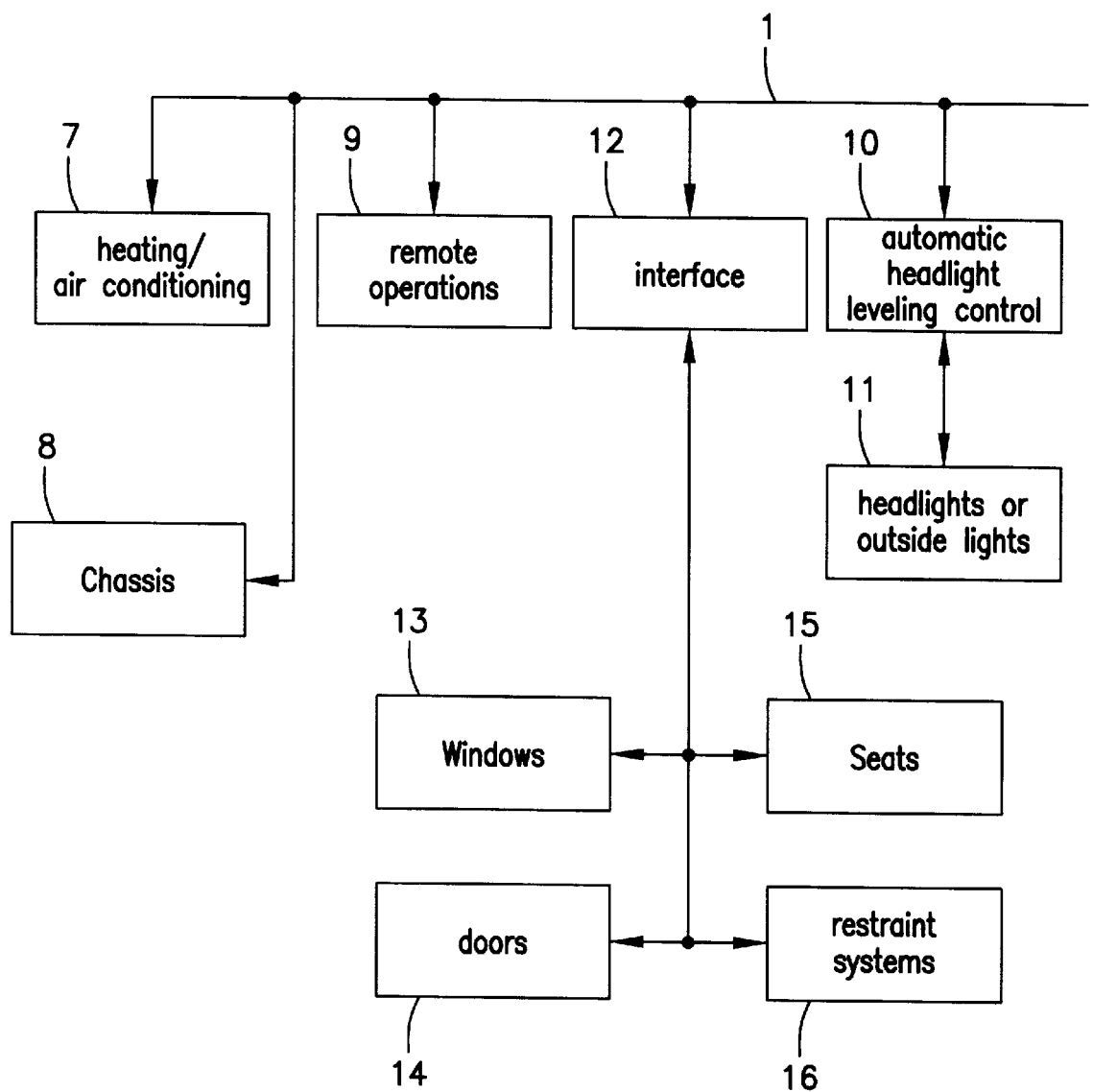
FIG. 1 shows a device according to the present invention which is connected via a plurality of bus systems to information sources and sinks inside a vehicle.
Figure 1B:
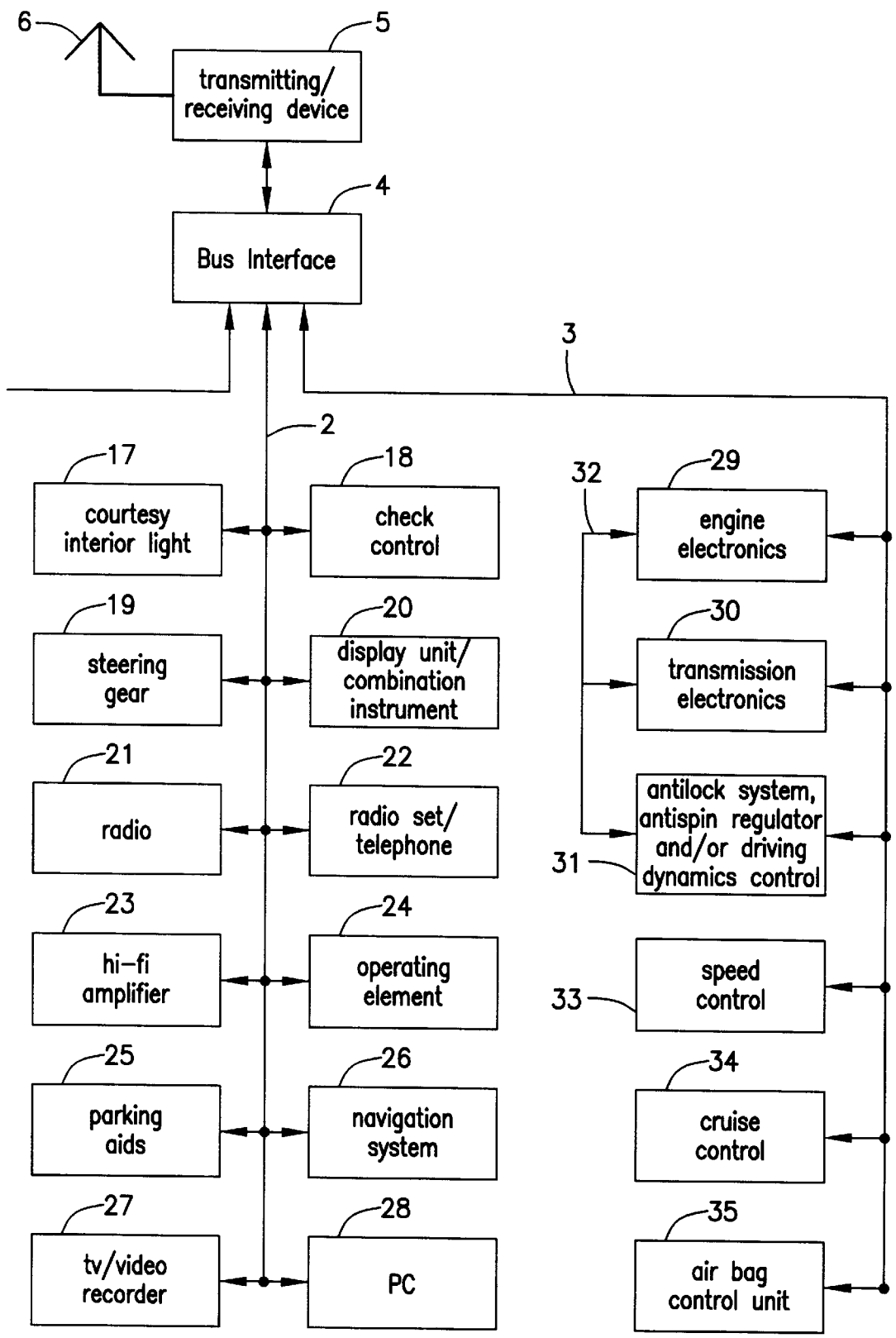

FIG. 1 in the form of a block diagram, depicts a comprehensive information system of a vehicle, it being entirely possible to add further undepicted components, although in many cases far fewer components may also be present. Due to differing requirements, especially regarding data transmission capacity, a total of three bus systems 1, 2, 3 are provided, which are connected via a bus-interface 4 to a transmitting/receiving device 5, which has an antenna 6.

Bus-interface 4 controls the access of transmitting/receiving device 5 to individual bus systems 1, 2, 3, and also optionally converts varying data formats. The following components are controlled or monitored via bus system 1: heating/air conditioning 7, chassis 8, remote operation 9, automatic headlight leveling control 10, headlights or outside lights 11, and, via a further interface 12, the actuation or control of windows 13, doors 14, seats 15, and restraint systems 16.

Second bus system 2 connects the following components to each other and, via interface 4, to transmitting/receiving device 5: courtesy interior light 17, check control 18, steering wheel or steering gear 19, display unit/combination instrument 20, radio 21, radio set/telephone 22, hi-fi amplifier 23, operating element of a special vehicle computer 24, parking aids 25, navigation system 26, TV/video recorder 27, and PC optionally having Internet connection 28.

Third bus system 3 mainly functions to control and monitor the drive train or the brakes, and for this purpose is connected to the components, engine electronics 29, transmission electronics 30, and a component 31 which contains an anti-lock system, an anti-spin regulation, and/or a driving dynamics control. Components 29 through 31, on account of the meaning and scope of the data exchange among them, are connected to a further bus system 32, independently of bus system 3. Connected to bus system 3 are also a speed control system 33, an automatic cruise control 34, and control unit 35 for an airbag. In principle, transmitting/receiving device 5 has access via bus-interface 4 to all information that is exchanged via bus systems 1, 2, 3. In this context, it can be determined by the worker skilled in the art, which information should be transmitted or received. In the following, a number of examples and the evaluation of this information are briefly discussed.

Thus, for example, the condition of component 31 (ABS+ASR+FDR) can be used for a controlled generation of traffic messages. If, for example, in response to each activation of an anti-spin regulation or of the anti-lock system, a message is transmitted to this effect that is received by a receiver situated on the roadway shoulder, it is possible to conclude from an accumulation of messages of this type that an icy patch has formed on the roadway in the area of this receiver. From an accumulation of messages concerning switched-on headlights, it is possible to draw a conclusion regarding fog or rain in the event that this switching-on is not occurring for other reasons (darkness at night, legal requirements).

Figure 2:
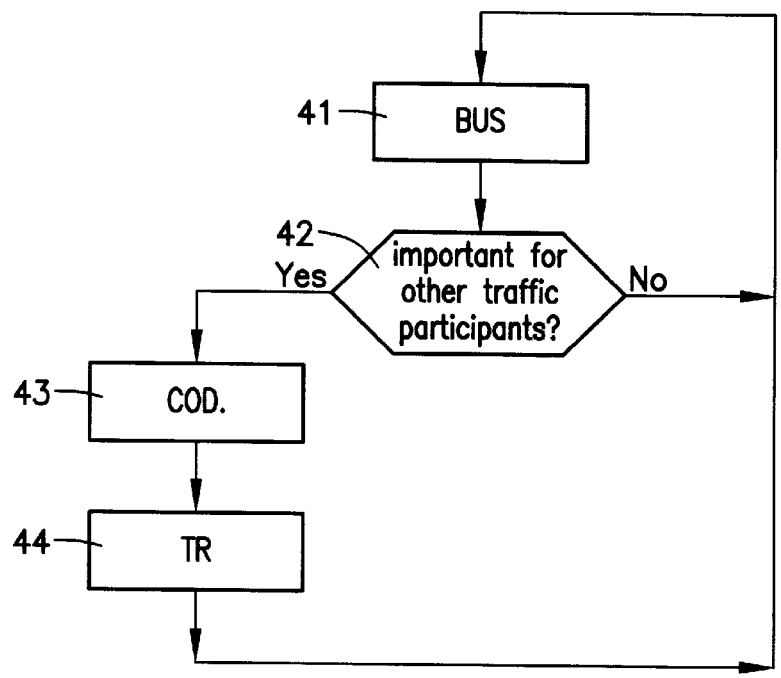
FIG. 2 shows a flowchart for selecting the information to be transmitted according to the present invention.

In the flowchart depicted in FIG. 2, the assumption is made that at 41 all the data present on the bus systems are available. In each case, a data set incorporating one piece of information is checked at 42 to see whether it could be important for other traffic participants and whether it should be communicated to them. If this is not the case, then at 41 the next piece of information is read out. However, if the information should be communicated to others, then at 43 a coding takes place and at 44 the transmission takes place via transmitting/receiving device 5. Although the present invention assumes transmitters having a short range of, for example, several 100 m, it is possible, in an individual case, to provide the transmission of individual informational entries over a greater transmission range, for example, using mobile radio.

Figure 3:
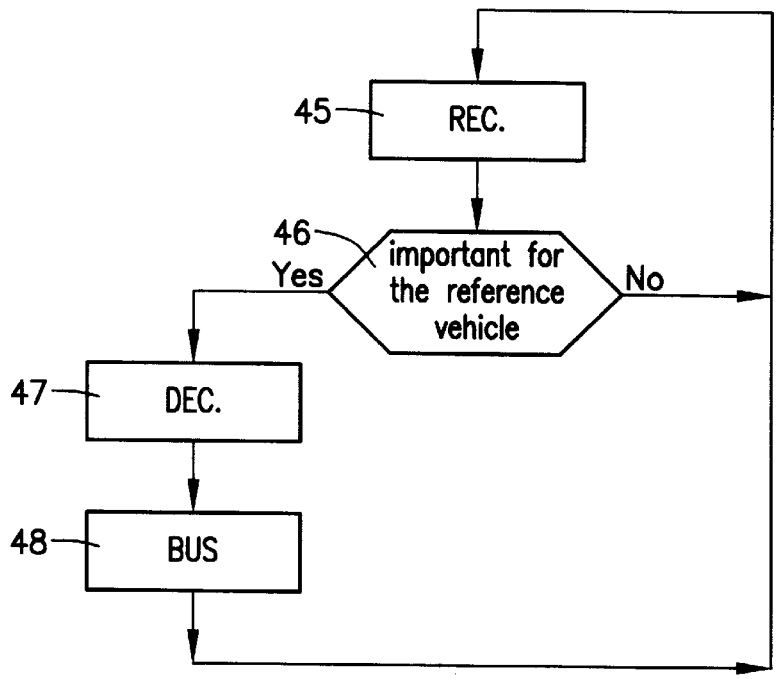
FIG. 3 shows a flowchart for selecting received information for further processing according to the present invention.

The flowchart according to FIG. 3 assumes that a receiver initially receives all information at 45, whereupon at 46 the respective information is checked as to whether it is important for the reference vehicle. If this is not the case, then at 45 the next informational entry is received and is checked at 46. If a piece of information is considered important for the reference vehicle, then at 47 a decoding takes place and at 48 a transfer to the bus system of the reference vehicle.

In addition to the possibilities previously described, it is also especially useful to equip transmitters on stationary objects such as traffic signals or road signs with a GPS receiver. GPS include, for example all receivers of this type which have the capacity autonomously to determine the location of the receiver based on satellite positioning systems. The information obtained in this manner concerning the location of the receiver can then be conveyed to the transmitter also located at this location, the transmitter transmitting this information together with the further information previously described. In this manner, the stationary transmitter knows its precise location, which makes it possible to calibrate, for example, the navigation systems on board passing vehicles. Further possibilities are to be seen in the ability to warn about present dangers, if the location of the danger is known. Thus, for example, a transmitter can be programmed such that at kilometer 87 a blocking of the right lane of a highway is transmitted. The transmitter itself can be positioned on the highway in front of the obstacle. On the basis of the GPS receiver, the transmitter is then able to autonomously calculate the distance to the construction site and thus to transmit the message that, for example, in 1000 m a blocking of the right lane will occur. This information is then received by the vehicle and is displayed on an instrument of the vehicle. As a result of this measure, a transmitter can be implemented very flexibly and can be positioned at any distance in front of a construction site, without undergoing any further adjustments of its own.

A further advantageous area of application of the present invention can be found in car rentals. In this context, the renter equips his vehicles with an individual identifier and thereby with the possibility of remote querying, e.g., regarding the mileage. When the vehicle passes by a transmitter installed in the vicinity of the auto rental agency, then a query can be initiated so that the vehicle communicates to the beacon not only its mileage but also, inter alia, the general state of the vehicle. The billing documents can then be prepared while the customer is coming to the window. In addition, the rental agency knows which vehicles are located in which area of the agency's parking lot.

What is claimed is:

1. A system for increasing traffic safety, comprising:
   a transmitter having a short transmission range equipped in an object located on or by a street, the transmitter configured to transmit safety-related data;
   a receiver arranged in a first vehicle, the receiver configured to receive the safety-related data; and
   an evaluation unit arranged in the first vehicle and coupled to the receiver, the evaluation unit configured to compare information in the received safety-related data with operational data of the first vehicle, the evaluation unit configured to determine whether the information is relevant to the first vehicle, wherein if the information is relevant to the vehicle, the evaluation unit displays an indication of at least some of the relevant information and initiating an intervention in a drive/brake system of the first vehicle.

2. The system of claim 1, wherein the object is a motor vehicle and the safety-related data includes operational data of the motor vehicle.

3. The system of claim 2, further comprising:
   a bus system arranged in the motor vehicle, the operational data being supplied from a device of the motor vehicle via the bus sytem.

4. The system of claim 3, further comprising:
   a device to convert a data format of the safety-related data, the device being arranged between the bus system and the transmitter of the motor vehicle.

5. The system of claim 2, wherein the operational data transmitted by the motor vehicle includes information on a specific position and a speed of the motor vehicle.

6. The system of claim 5, wherein the information on the specific position and the speed include both quantity and direction.

7. The system of claim 5, wherein the operational data transmitted by the motor vehicle further includes information on changes in the operational data.

8. The system of claim 5, wherein the operational data transmitted by the motor vehicle further includes information regarding operator inputs in the motor vehicle.

9. The system of claim 5, wherein the operational data transmitted by the motor vehicle further includes switching information, the switching information including at least one of:
   turn signal lights right/left on, light, fog light on/off, and windshield wiper on/off.

10. The system of claim 2, wherein the transmitted operational data includes authorization information.

11. The system of claim 1, wherein the object is one of a traffic signal and a road sign, and wherein the safety-related data includes a position and meaning of the object.

12. The system of claim 1, wherein the object is a stationary traffic guidance device, and wherein the safety-related data includes a position of the traffic guidance device.

13. The system of claim 1, wherein the transmitter is configured to transmit data for identifying the object.

14. The system of claim 1, wherein the transmitter is fed a GPS location signal of a GPS receiver situated at a location of the transmitter.

* * * * *

UNITED STATES PATENT AND TRADEMARK OFFICE
CERTIFICATE OF CORRECTION

PATENT NO. : 6,429,790 B1
DATED : August 6, 2002
INVENTOR(S) : Thomas Frese et al.

It is certified that error appears in the above-identified patent and that said Letters Patent is hereby corrected as shown below:

<u>Title page,</u>
Item [57], ABSTRACT, change "sheet" to -- street --

Signed and Sealed this

Fourth Day of November, 2003

JAMES E. ROGAN
*Director of the United States Patent and Trademark Office*